US008648908B2

(12) United States Patent
Ruohonen et al.

(10) Patent No.: US 8,648,908 B2
(45) Date of Patent: Feb. 11, 2014

(54) SYSTEM FOR DETECTING INCORRECTLY FUNCTIONING SENSORS IN A VISITOR COUNTING SYSTEM

(75) Inventors: Juha Ruohonen, Parainen (FI); Lauri Ruohonen, Parainen (FI)

(73) Assignee: Teknovisio OY, Parainen (FI)

( * ) Notice: Subject to any disclaimer, the term of this patent is extended or adjusted under 35 U.S.C. 154(b) by 1612 days.

(21) Appl. No.: 11/910,976

(22) PCT Filed: Apr. 10, 2006

(86) PCT No.: PCT/FI2006/050135
§ 371 (c)(1),
(2), (4) Date: Oct. 8, 2007

(87) PCT Pub. No.: WO2006/108916
PCT Pub. Date: Oct. 19, 2006

(65) Prior Publication Data
US 2008/0239073 A1 Oct. 2, 2008

(30) Foreign Application Priority Data
Apr. 11, 2005 (EP) .................................... 05102841
Apr. 10, 2006 (WO) .................. PCT/FI2006/050135

(51) Int. Cl.
*H04N 7/18* (2006.01)
*H04N 5/225* (2006.01)

(52) U.S. Cl.
USPC ........................................... 348/143; 348/169

(58) Field of Classification Search
USPC ................................................. 348/143, 169
See application file for complete search history.

(56) References Cited

U.S. PATENT DOCUMENTS 6,415,276 B1 7/2002 Hager
2002/0152056 A1 10/2002 Herzog et al.
2003/0177216 A1* 9/2003 Sutherland et al. ........... 709/223
2004/0088318 A1* 5/2004 Brady ........................... 707/102
2004/0145658 A1 7/2004 Lev-Ran et al.
2004/0238628 A1 12/2004 Clark et al.
2006/0067456 A1 3/2006 Ku et al.

FOREIGN PATENT DOCUMENTS

DE 4220508 12/1993
EP 0742534 11/1996
EP 1482455 A2 12/2004
WO 03/091955 11/2003

OTHER PUBLICATIONS

CheckCount, automaattinen kavijatilastointjarestelma. Checkpoint-Meto Finland Oy [Retrieved from the Internet <URL:http://web.archive.org/web/20050214215515/www.checkcount.fi/fi/?page=mainpage>.
Checkcount, Automatic Visit Log System, Checkpoint-Meto Finland Oy [Retrieved from the Internet at http://www.checkcount.fi, Oct. 8, 2007.

* cited by examiner

*Primary Examiner* — Rupal Dharia
*Assistant Examiner* — Joe Chacko
(74) *Attorney, Agent, or Firm* — Shalom Wertsberger; Saltamar Innovations

(57) ABSTRACT

In a visitor counting system a plurality of sensors (107, 108, 109, 110) count the number of visitors passing by. A data-recording device (105, 106) connected to the sensors store records comprising the number of visitors counted within a predetermined time period. A remote visitor data processing unit (120) further comprises a record validation block for checking validity of the records, an interpolation block for creating new records to substitute the incorrect records, and a faulty-sensor detection block for concluding, based on the records, whether a sensor is faulty.

14 Claims, 4 Drawing Sheets

SYSTEM FOR DETECTING INCORRECTLY FUNCTIONING SENSORS IN A VISITOR COUNTING SYSTEM

TECHNICAL FIELD

This invention relates to visitor counting systems comprising a plurality of sensors for counting the number of persons residing in detection areas of the sensors, at least one data recording device connected to the sensors for recording visitor data generated by the sensors, and a server for processing said data.

BACKGROUND OF THE INVENTION

Retail and other business establishments that serve a large number of customers generally have a problem obtaining information about the number of persons visiting their premises. However, information about the number of visitors currently visiting the premises and distribution of the visitors in time is extremely valuable not only for arranging enough staff to serve customers where it is needed but also generally in planning the business.

It is known in the art to arrange sensors at the entrances to the premises for counting the number of persons that have gone in and out. A sensor may comprise a photoelectric cell and a counter both integrated in the same case. Every time when a person passing by cuts the beam of the photocell, the reading of the counter is increased.

Sensors based on photoelectric cell technology may yield erroneous figures. This is due the fact that two or more persons moving side-by-side may increase the reading of a sensor only by one. Therefore, the sensor gives readings that are too low. Especially with high visitor flows, the error accumulates along with the growing flow of people. Counting accuracy can be improved by installing several photocells in parallel but this increases costs.

More accurate counting results are achieved by mounting a thermal imaging sensor on the ceiling above a passageway. The sensor applies thermal imaging technology that uses infrared recognition to gather information about the size, placement, direction and stopping of an object beneath. Relying on these parameters the operator can decide which objects are accepted to increase the reading of the counter. The thermal imaging sensor can count visitors along the passageway even when several persons walk next to each other. In this way high accuracy can be achieved which is not dependent on the level of light or color changes. A typical recognition field of the thermal imaging sensor is about 4.5 m×4.5 m. By chaining several thermal-imaging sensors it is possible to monitor very wide passages.

Further, a sensor of radar type is also known. It detects any form of movement in a room and can even penetrate some construction materials. Also a mat sensitive to dynamic force may be used as a sensor especially in places where only one person in turn crosses the mat.

It is also known to connect outputs from a plurality of counters to a visitor data processing computer that receives visitor data flow. The computer includes a specific software program that is adapted to process the visitor data and produce various types of reports. Thus, a report may tell the number of visitors per hour, day, week, and year in the form of figures and/or graphic charts, for example.

However, instead of connecting the counters directly to the computer its is advantageous to connect them to a data-recording device comprising a buffer memory for temporarily storing incoming data received from the counters, a memory for persistently storing visitor data, and an data transfer interface for communicating with the computer. In addition, the data-recording device includes a clock for giving accurate time for time stamps that are attached to pieces of data. Especially when several sites in an establishment are provided with several visitor counters it is practical to wire the counters of a site to a data-recording device installed at that site. In order to avoid additional wiring and making installation easy and rapid, it might be advantageous to connect the data-recording devices wirelessly to the visitor data processing computer. Today many establishments like stores are provided with a WLAN-network wherein that network may be used to carry communication between the data-recording devices and the visitor data processing computer.

Hence, each counter is wired to its own terminal in the data-recording device that accordingly knows the origin, i.e. the counter, of each incoming data flow. Therefore the data-recoding device is able to attach a counter identifier and the time stamp for each dataflow.

For example, a merchant is interested in getting information about the number of visitors per hour. There are several entrances to and exits from his store, each entrance and exit being equipped with at least one photocell visitor counter. Now, the data-recoding device is instructed to store readings from the counters in the buffer memory and also put a time stamp indicating beginning of each record. After one hour's buffering period has lapsed, the data-recoding device inserts the records from the buffer memory into the non-volatile memory. Each record is provided with a time stamp indicating the end of the buffering period and also with the identifier of the counter that generated the data of said record. As a result, the non-volatile memory contains a data record for each counter, the record comprising time stamps indicating the starting and ending moments of the data collecting period, the counted number of visitors during the period, and the identifier of the counter. At the same time incoming data for the next period are collected in the buffer. In this manner the non-volatile memory contains an increasing amount of records, from which the records of a certain counter and their chronological order are easily extractable. After the store has been closed for that day, all the records are transmitted to the visitor data processing computer that processed the records and generates various reports and graphic charts.

Most often the above-described visitor counting system is local, i.e. the system is installed in an establishment and operated and managed locally. However, by combining several local systems it is possible to build a large system that is managed and operated remotely.

FIG. 1 illustrates such a system. In establishment 10, which may be a large store, there are several sensors counting visitors passing by. Thermal image thermal imaging sensor 101 located at the ceiling of a wide entrance point counts the number of people below. Photoelectric sensor 102 fitted in the wall of a corridor counts the number of people passing by whereas a sensor using a dynamic force-sensitive matt 104 located at the floor of a lift counts the number of lift passengers. The output of each sensor is connected to a respective terminal of data recording device 103. In this example there are three input terminals but the data-recording device may have several input terminals for connecting additional sensors when needed. Every time when a sensitive element of the sensor detects a visitor within its influencing area, it produces a pulse that increments the counter. The pulse is also transmitted to the terminal of the data-recording device wherein a counter in the device is also incremented and the current counter value is stored in a buffer Thus, the visitor flows passing by sensors 101, 102 and 104 cause the counter value in the respective buffer to be increased. Periodically the values in the buffer are shifted to appropriate fields of records to be formed.

FIG. 2 depicts fields of the record. The record contains time stamp field 21 for storing date and time of the starting instant of the counting period, another time stamp field 22 for storing date and time of the ending instant of the counting period, a field 23 for storing the identifier of a sensor, a field 24 for storing the counter value shifted from the buffer, and one or more fields 25 for additional data. These kinds of records are generated periodically for each sensor connected to the data-recording device.

In other words, in pre-set time periods the counter value in the buffer is shifted to the non-volatile memory of the data-recording device. The time period may be one hour, for example. At the same moment the buffer is also cleared for receiving counter values of the next period. Hence, upon the lapse of the time period the counter value is shifted to counter value field 24 of the record to be formed. The time stamp indicating the starting instant of the period has been inserted in the field 21 previously as well as the individual identifier of the sensor in question into the field 23. The current time stamp is also inserted into the second time stamp field 22 indicating the ending instant of the period.

Referring back to FIG. 1, in another establishment 11, that may be a multi-story shop, there are tow data-recording devices 105 and 106. Thermal imaging sensor 107 is counting the number of people below whereas photoelectric sensors 108 and 109 are counting the number of people passing by along a corridor or via a gate, for example. These sensors are located physically near enough each other so that the sensors are wired to common data-recording device 105. Other sensors 110 and 111 are wired to another data-recording device 106. Both data-recording devices generate periodically above-explained records and store the records in a non-volatile memory.

Instead of processing gathered counter values, i.e. records, locally in a dedicated computer, the records are processed centralized in a remote visitor data processing unit 120. Therefore, in response to a request received from the visitor data processing unit, data-recording devices 103 and 105 transmit the collected records via a transmission network to the visitor data processing unit. The transmission network may be a wired network 115 like PSTN or a computer network as the Internet, or a wireless network 116 as any cellular network. Corresponding telecommunication facility for communicating with the visitor data processing unit is installed in the data-recording devices. For example, the data-recording device 105 includes a built-in cellular phone, which makes installation of the visitor counting system in an establishment reasonable easy and fast.

The visitor data processing unit takes a connection with the data-recording devices automatically. Advantageously the connections are set up in the nighttime when the establishments are closed and the records of the whole previous day are available in the data-recording devices. During the connection the records are transmitted to the visitor data processing unit and cleared from the memory. In addition, the visitor data processing unit updates the clocks of the data-recording devices so that their date and time are always accurate. If the first connection attempt fails subsequent attempts are made until all records are transmitted. The records are stored in a database as a raw data.

After the visitor data processing unit 120 has fetched all the data gathered by the data-recording devices in the establishments 10 and 11, it starts to process the raw data. Processing is made relating to each establishment and to each particular sensor in the establishment. This is possible because the records of a particular sensor are easily extractable from the raw data based on the sensor identifier. Henceforward the flow of records originating from a sensor is called as "sensor channel".

Basically the processing is straightforward; the records of the desired sensor are extracted from the raw data and then the records are arranged in chronological order using the time stamps. Thereafter visitor statistics in the form of various graphs and figures depicting the amounts of visitors per time period (e.g. per hour) are formed. By combining statistics based on the sensor channels originating form the same establishment a plurality of summary reports are produced that the administrator of the establishment in question can utilize in business.

US 2004/238628 A1 discloses a people counting system comprising a plurality of "people counting data collection units", which are termed briefly "units". The units include appropriate hardware and/or software to gather, store, analyze, and present the people counting statistical data. A unit can advertise its presence to other units of the people counting system so that other units will be aware of the existence of that unit. A unit may be configured to advertise its presence to other units at certain time intervals by sending messages. Once each unit is aware of the other units, each unit maintains or has access to a list of all the advertised units. In addition to maintaining the list of advertised units, a unit can automatically, or via instruction from a user, access people counting statistical data from any unit of the system.

A drawback of the today's centralized visitor counting systems is that they do not pay attention to the validity of data. Namely, data or a piece of data may be incorrect due to incorrectly functioning sensors. In other words, if a sensor that previously has functioned properly for some reason starts to count visitors erroneously, said erroneous data is not detected but they distort the reports. Moreover, the faulty sensor can produce erroneous data for a long time until it will be, perhaps, discovered in a maintenance operation. In addition, data or a piece of data may also be incorrect due to a data transmission failure or a drift in time and date settings in the data-recording device.

Another drawback relates to missing data. When some records are totally missing in the raw data it results in empty figures in reports. For example, if the record of a sensor that should indicate the number of visitors passed by the main entrance of a store between 2 and 3 p.m. is missing, the report tells that no visitors have come in during that time. In fact, quite often the raw data contain missing and invalid records, which decreases reliability of the reports.

BRIEF SUMMARY

An objective of the present invention is to devise a system that automatically discovers incorrectly functioning sensors. Another objective is to increase reliability of reports.

The objectives are achieved with a record validation block, an interpolation block, and a sensor-identifying block, all blocks residing in a visitor data processing unit.

The record validation block checks all records of raw data prior to further processing. It selects a sensor channel, retrieves the records belonging to that channel, and arranges the records in temporal order. Then a preset mask is applied for filtering out records that are not taken into consideration. Thereafter, various tests are carried out. The tests include at least examination of time stamps, examination of counter values, and examination whether records are missing.

The sensor-fault identifying block receives information about missing records whereupon based on said information and information about data recording devices it will be able to identify the faulty sensor if any.

The interpolation block that is operatively connected to the record validation block and the sensor identifying block corrects faulty records by interpolating new visitor number values for said records, wherein values obtained on the same sensor channel in previous days and/or in same day are utilized. Also if there are missing records then entirely new records are created by interpolation. The corrected records as well the entirely new records are called modified records.

The interpolation can be carried out automatically whenever a faulty record is found. But preferably the interpolation is not performed until the manager of the establishment in question gives permission to do so. In other words, after all the records of the raw data produced by the sensors of an establishment have been validated and faulty records have been found, an alert message will be automatically sent to the administrator. The alert message can be e-mail, a text message (SMS), a multimedia message (MMS), or like, addressed to the administrator. Further, the message may contain only a general statement "faulty records found" and a request for allowing the system to correct the faulty records with interpolation. Optionally, the message may be more detailed thus containing a list of those sensors generating faulty records. For example, in receipt of the message the administrator checks the list and notices that it includes a sensor locating at the entrance that had been closed in that particular day. Therefore, in the reply message he gives permission to interpolate new records for the sensors excluding this particular sensor. Thus, the administrator, who has best knowledge about operation of the sensors in the site, controls the interpolation.

Finally the database of the visitor data processing unit is updated with the modified records.

All sensors connected to the system may be validated either periodically or when there is a reason to doubt proper functioning of a sensor. Validation can be implemented by providing a movable sensor validation unit. The unit may include a special validation camera installed near the sensor and it compares the number of the visitors counted by the sensor within a predetermined period with the number of the visitors counted based on the video sequence taken by the camera within the same period. When it is noticed that the sensor gives values too high or too low, a sensor-specific correction factor is calculated. The correction factor is stored in the memory of the data processing unit wherein the record validation block corrects the raw data relating to the sensor prior to further processing. Alternatively, the sensor validation unit can be implemented by providing a calibration unit comprising of an accurate sensor and a data-recording device. Results obtained from the sensor to be validated are compared with the results obtained form the calibration unit, whereupon correction factor for the sensor will be calculated. Apparently, combination of a calibration unit and a validation camera may also be used for creating the correction factor for a sensor.

DESCRIPTION OF THE DRAWINGS

The invention is described in detail with reference to the drawings in which.

DESCRIPTION OF THE INVENTION

Figure 7:
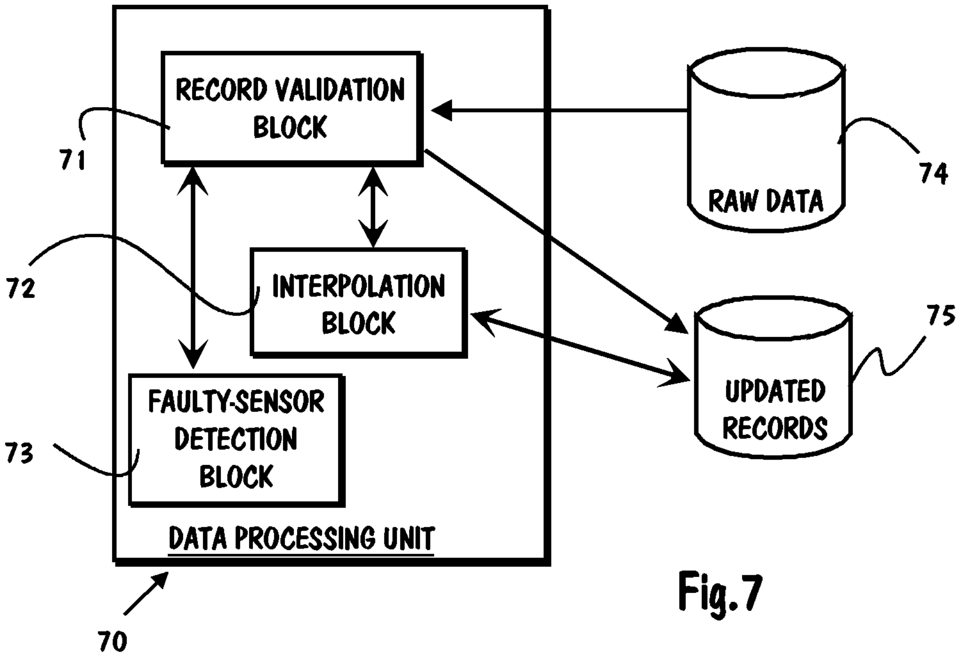
FIG. 7 depicts functional blocks of the invention.

FIG. 7 shows a data processing unit provided with the functional blocks of the invention. The blocks consist of record validation block 71, interpolation block 72, and faulty-sensor detection block 73. Records that are fetched from data-recording devices of the system are stored as raw data in database 74.

From there the record validation block 71 fetches records and performs validation process. In case a record is deemed valid it is stored in database 75 of updated records. But if the record is faulty due to the incorrect time stamp or improper counter value in the counter value field, the record is transferred to interpolation block 72 that creates a new counter value using either interpolation or extrapolation. For that purpose the interpolation block can use existing records both from database 74 and database 75 as will be explained later. The interpolation block is also able to create totally new records if some records are missing in the temporal sequence of the records of a sensor channel.

Faulty-sensor detection block 73, which is operatively connected to the record validation block, gets information about missing records of a sensor channel. Based on said information and information about missing records of other channels the faulty-sensor detection block concludes whether the sensor in question is faulty.

Figure 1:
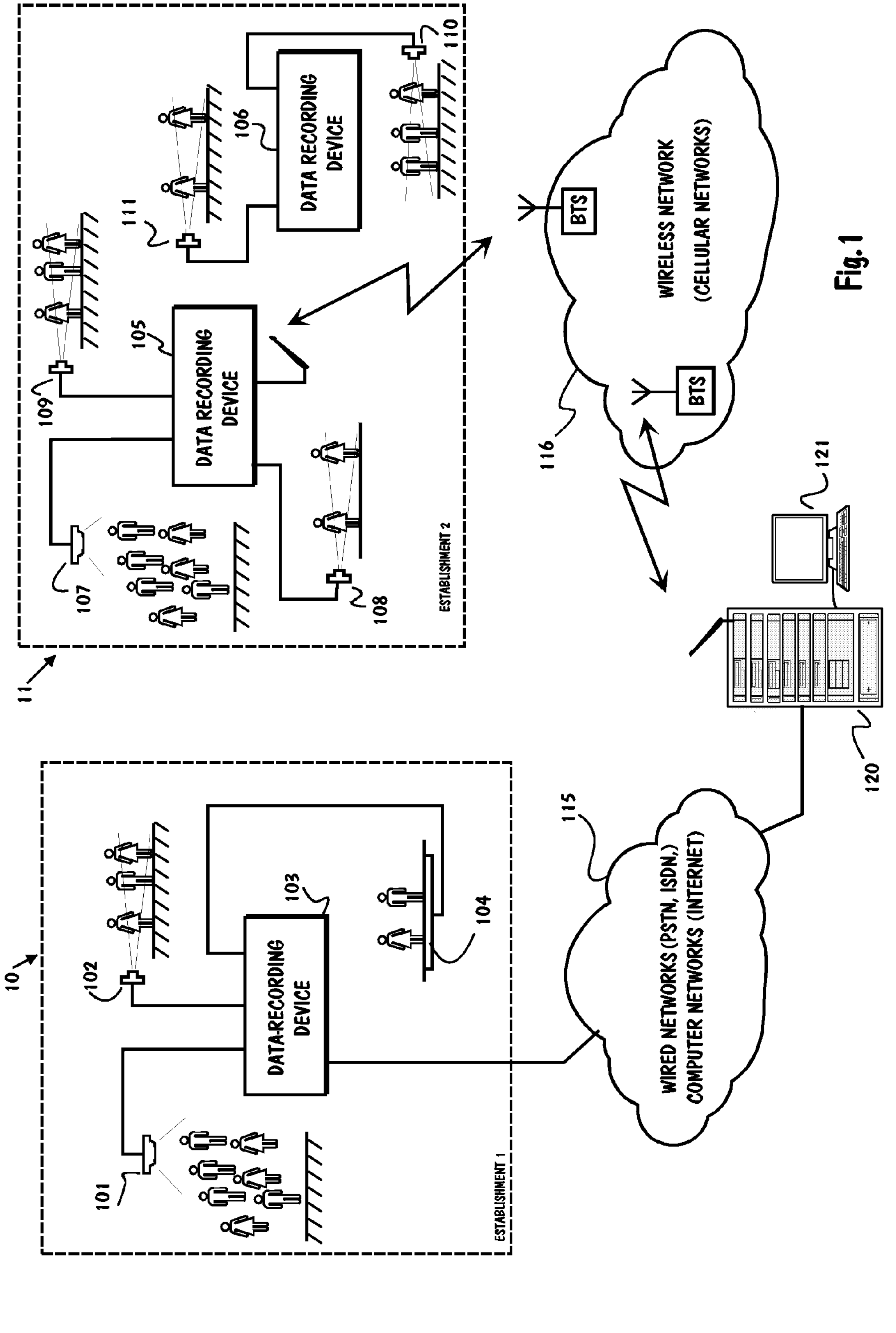
FIG. 1 depicts main elements of a visitor counting system.
Figure 2:
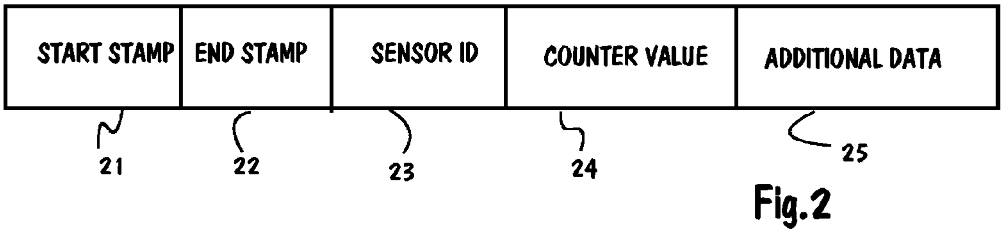
FIG. 2 shows fields of a counter record.
Figure 3:
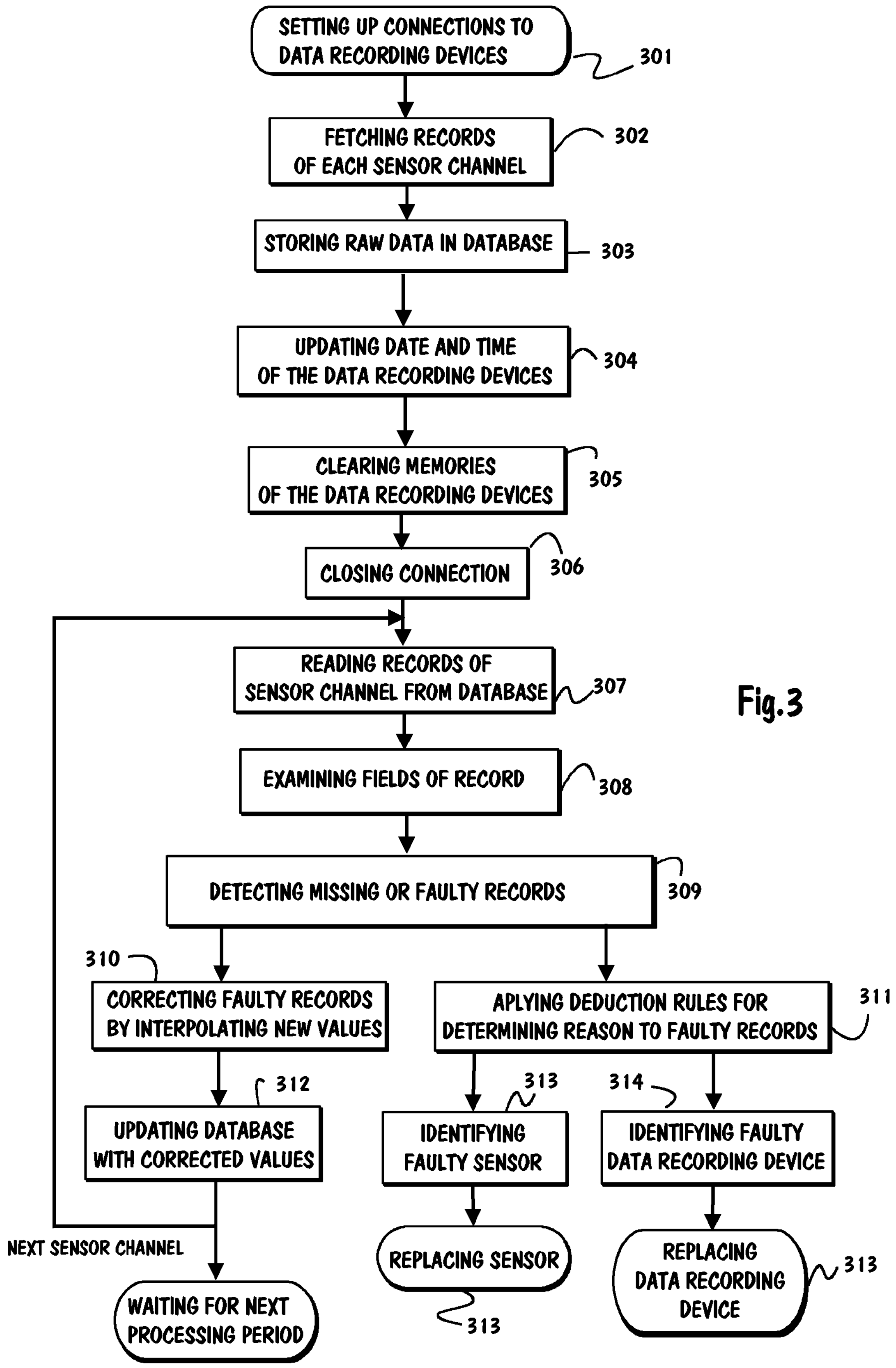
FIG. 3 illustrates main steps performed by blocks according to the invention.

FIG. 3 illustrates steps carried out by the system having main elements as illustrated in FIG. 1 and the blocks of the present invention.

A visitor data processing unit sets up a connection to each of the data recording devices residing in an establishment, step 301, and fetches all records stored therein, step 302. In case the first attempt to establish a connection fails the visitor data processing unit tries again until the connection has set up. Preferably the connection is set up in the night-time or after the establishment (a store) has closed. All records are stored as raw data in a database of the visitor data processing unit, step 303. At the end of the connection the visitor data processing unit updates date and time of the data-recording device by downloading an accurate clock, step 304, clears the records from the data-recording device's memory step 305 and closes the connection, step 306.

In this manner the visitor data processing unit polls all the data-recording devices for obtaining the records stored therein and for storing the records in its database.

Thereafter the record validation block selects a sensor channel to be validated and starts reading records belonging to that channel, step 307. The selection order can be any but preferably the selection is made establishment by establishment; the sensor channels belonging to the same establishment validated in succession, starting from the sensor channels of one data-recording device and ending to the sensor channels of the last data-recording device.

The record validation block first examines acceptability of the record in question, step 308. Examination carried out by analyzing the content of the fields of the record. If there is nothing aberrant in values of any field of a record, it is accepted. In the opposite case the record is deemed faulty or it may even happen that there is no record at all, i.e. the next record in the sequence is missing, step 309. In both case the interpolation block is instructed to interpolate new values for one or more fields of the record. Usually this block interpolates new values for the counter value field, step 310. When necessary, new values for time stamps are also inserted to the time stamp fields. Then the database is updated by replacing the faulty record with the corrected record, phase 312.

The sensor-fault identifying block determines reasons for faulty records, step 311. It is pointed out here that also missing records are deemed faulty records. If records of other sensor channels of the same data-recording device are missing too, the conclusion is that the data-recording device is faulty, step 314. An alert is given and the faulty device can be replaced, step 316. But if records of the sensor channel to be examined are missing, the conclusion is that the sensor in question is faulty, step 313. The manager of the establishment is then notified of the faulty sensor so that it can be replaced, step 315. Notwithstanding the reason for a faulty or missing record, a new record is generated and the interpolation block interpolates new visitor count values for the record.

Figure 4:
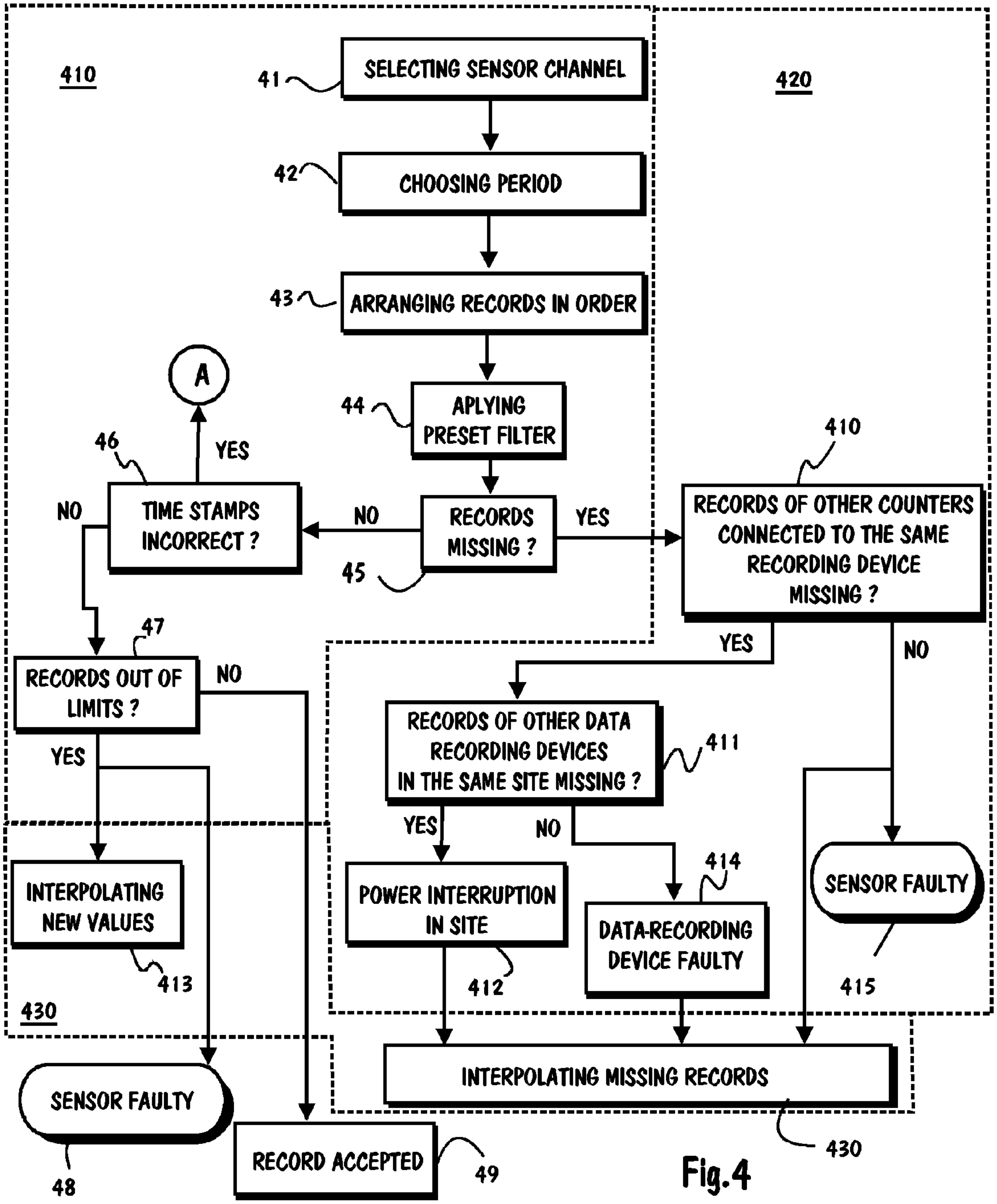
FIG. 4 shows in detail steps performed by the blocks of the invention.

FIG. 4 depicts in more detail the steps that the record validation block 410, the interpolation block 430 and the faulty-sensor detection block 420 carry out. The first task of the record validation block is to select the sensor to be validated, step 41. For example, the operator of the system has decided to check the number of visitors in certain store and naturally all sensor channels in this store are examined. Then a desired period is selected, step 42. Preferably the period is one day, particular the previous day because the records are fetched from the data-recording devices in the night. After selecting the sensor channel and choosing the period, the records are retrieved from the database comprising raw data, whereupon the records are arranged in chronological order by the timestamps, step 44.

Next, a mask is applied to the records in order to filter out certain records, step 44. Namely, some days like holidays and days when the establishment is closed are out of interest. The manager of the establishment is notified such days to the operator of the invented system who in turn creates the appropriate filter. Then the record validation block checks are there any records missing, step 45. This checking step may also be done in conjunction with arranging records in order. Is records are missing, information about that is given to the faulty-sensor detection block 420.

Figure 5:
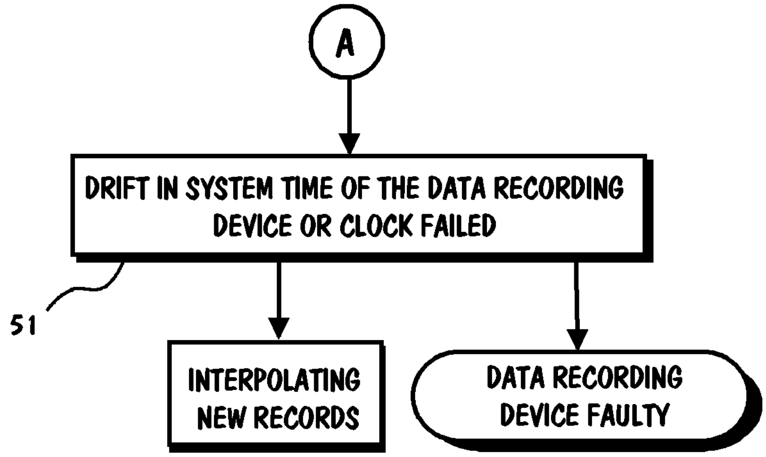
FIG. 5 illustrates a branch from the block diagram of FIG. 4.

If there are no missing records then the record validation block 410 examines time stamps of the records, step 46. The counter value itself in the record may be correct but time stamps may be incorrect. Namely, there can be a time drift in comparison with a reference time, time stamps may fluctuate or they may be incomplete, see step 51 in FIG. 5. In such case the system gives an alert for clock fault in the data-recording device. Anyhow, new records are interpolated; step 52 in FIG. 5, or time stamps are corrected.

If the time stamps are correct, then the record validation block 410 examines correctness of the counter value in the record, step 47. It is assumed that the counter value has some average or expected value. Thus, a predetermined tolerance may be attached to each sensor, wherein counter values obtained from a sensor are allowed to fluctuate within the tolerances without any correction measurements. Moreover, allowed tolerances may be flexible, i.e. they may vary in connection with time or the current counter value average. In addition, as a result of a heavy advertisement campaign in a store there will be probably a rush day in the store. Therefore said tolerances may be expanded for that day in order to avoid unnecessary corrections of counter values.

Preferably upper and lower limit values are applied, wherein the counter value being between the values the record is accepted, step 49. It is worth noting that the limit values are flexible and sensor-specific; they can be adapted to a certain sensor channel by taking into account historical records of said channel at the same point in time. Thus, if the counter value is remarkably lower or higher than an expected value then it is very likely that the sensor is faulty, step 48. The counter value is rejected and an alert is given whereupon the manager of the establishment in question may replace the sensor. In addition, a new value for substituting the rejected value is interpolated, step 413, and the database is updated with the corrected record.

If the checking step performed by the record validation block results in discovery of one or more missing records, it shifts the task to the sensor-fault identifying block 420. Said block collects information about missing records of all sensor channels of the establishment concerned. In case there are missing records in a certain sensor channel attached to a certain data-recording device, then the sensor-fault identifying block examines whether records are missing also on other channels attached to the same data-recording device, step 410. If no records are missing on other sensor channels the sensor-fault identifying block determines that the sensor is faulty, step 415, and gives an alert.

But if records are also missing on other sensor channels in connection with the same data-recording device, then the sensor-fault identifying block checks whether records of other data recording devices in the same site are missing, step 411. In case missing records are found then the sensor-fault identifying block makes the conclusion that power interruption in the site has taken place, step 412. Accordingly, in case missing records are not found from the raw data obtained from other data recording devices, the sensor-fault identifying block concludes that the data-recording device in question is faulty, step 414.

Despite the reasons for missing records, substitute records are created and new counter values to counter value fields of the records are interpolated, step 416.

Referring back to steps 410 and 411, the number of missing records which causes one of the conclusions "faulty sensor", power interruption is site" or "fault in the data-recording device" may be chosen freely. When only one or a few records are missing then an error in the transmission network is a more likely reason than a fault in the sensor or data-recording device. On the other hand, if a rather long sequence of records of the same channel is missing the probability of a fault in the sensor is high. It is up to the skill of the operator of the visitor counting system to determine the threshold number of missing records that leads to the alert for the sensor fault.

Missing records in the raw data appear like information holes. In addition, erroneous counter values in some existing records distort information. These elements are corrected either by creating new records to substitute missing records or correcting erroneous counter values. Correction can be based on interpolation, wherein new or corrected values are created using existing and reliable records on the same sensor channel, which have time stamps prior to and after the time stamp of the record to be created or corrected. Correction can also be based on extrapolation, wherein only records with time stamps prior to the time stamp of the record to be corrected are used.

The visitor counting system also creates a correction log that contains information about performed interpolations and corrections per each sensor channel. The operator who tracks the correction log is able to discover that the amount of interpolation operations made on some certain channel is conspicuous although the sensor in question is not faulty because missing records do not exist. Therefore, according to one aspect of the invention, the suspected sensor can be validated.

Figure 6:
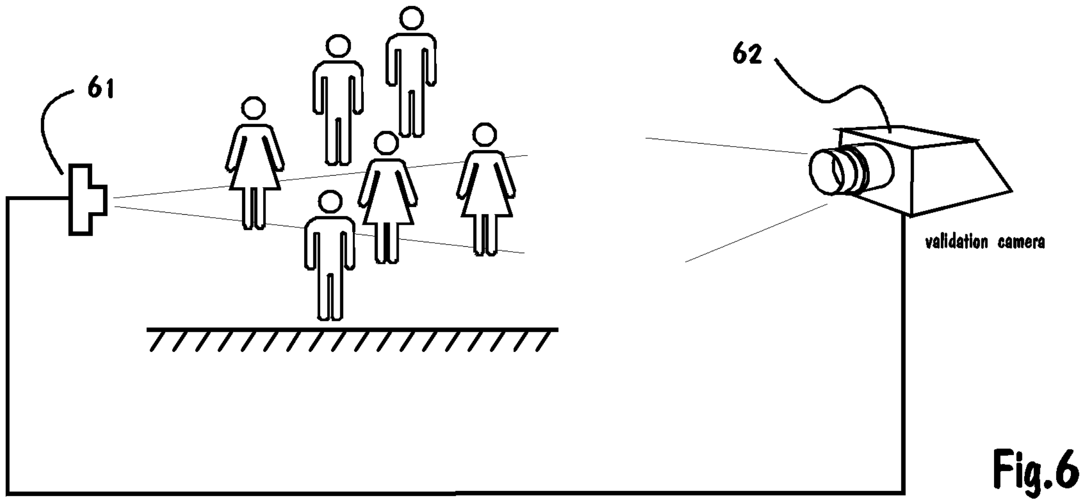
FIG. 6 illustrates validation of a sensor.

FIG. 6 shows the basic principle of validation. The purpose of the validation process is to ensure that the number of visitors counted by a sensor in a certain time period is correct. Thus, a validation camera 62 is installed on the same site as sensor 61 and it is facing to the same direction as the sensor does. Functions of the data-recording device are built in the camera wherein output of the sensor can be connected to the validation camera. In addition, the validation camera includes network connection means for establishing a connection to the data processing unit. Now, for a certain time period the sensor counts the number of visitors passing by and the values are stored in the data-recording device of the validation camera. At the same time the validation camera films the visitors and records the video sequence in a memory. Then the validation camera sends the results via a transmission network to the visitor data processing unit. The operator of the system calculates manually from the video sequence the number of the visitors and compares said number with the numbers generated by the sensor to be validated. When necessary a correction factor is calculated, whereupon a correction factor for the sensor is created. The correction factor is stored in the memory of the visitor data processing unit wherein the record validation block henceforward corrects the raw data relating to this sensor prior to further processing. Simply multiplying the visitor number obtained from the sensor by the correction factor may do the correction. Then the corrected records are processed as explained previously.

Alternatively, validation can be implemented by providing a calibration unit comprising of an extremely accurate sensor, a thermal imaging sensor for example, and a data-recording device.

An artisan of the art naturally understands that the functions of the record validation block, the interpolation block and faulty-sensor detection block may be realized in various ways. In addition, it has to be pointed out that the previous examples are intended only to illustrate the invention. Other modifications will also be apparent to those skilled in the art. The invention is intended to use primarily in visitor counting systems. A skilled artisan however understands that the invention is also applicable to counting moving objects, such as moving vehicles, animals, etc.

The invention claimed is:

1. A full-automatic visitor counting system, comprising:
   - a plurality of fixed sensors installed in an establishment, each sensor counting the number of visitors passing by the sensor and producing a count signal per each visitor,
   - a plurality of data-recording devices for receiving the count signals from the sensors connected thereto via unidirectional transfer links and storing, for each sensor, records each comprising the number of visitors counted within a predetermined time period,
   - a visitor data processing unit connectable through a transmission network to the data-recording devices for fetching records stored therein,
   - a database for storing the records, the visitor data processing unit further comprising:
   - a record validation block operatively connected to the database, the record validation block being adapted automatically to,
     - select a sensor channel, the sensor channel being a flow of records originating from one of the plurality of sensors, as stored in the database,
     - read from the database the records of a desired period belonging to the selected sensor channel,
     - check the correctness of each of the records based on the number of visitors and a time stamp included in the record,
     - accept a correct record and discard an incorrect record,
   - an interpolation block operatively connected to the record validation block and the database, said interpolation block being adapted to automatically create a new record for an incorrect record of the selected sensor channel by utilizing accepted records of the same sensor channel, and to substitute the incorrect records with the new records,
   - a faulty-sensor detection block operatively connected to the record validation block, said faulty-sensor detection block being adapted to
     - receive information about missing records relating to the selected sensor,
     - compare said information with information about missing records relating to the other sensors connected to the same data-recording device and based on the comparison conclude whether the selected sensor is faulty.

2. The visitor counting system as in claim 1, wherein the record validation block includes an adjustable filter for filtering out records belonging to a chosen time window.

3. The visitor counting system as in claim 1 wherein the record validation block is further adapted to check time stamps of the records.

4. The visitor counting system as in claim 1, wherein the record validation block is further adapted to compare the number of visitors included in the record with preset limits, wherein the number of visitors being outside the preset limits the record is discarded.

5. The visitor counting system as in claim 1, wherein the record validation block is further adapted to arrange the records relating to the sensor in temporal order.

6. The visitor counting system as in claim 1, wherein the interpolation block creates the new record by interpolating a new value for the number of visitors from the number of visitors in the accepted records of the same sensor.

7. The visitor counting system as in claim 1, wherein the interpolation block creates the new record by extrapolating a new value for the number of visitors from the number of visitors in the accepted previous records of the same sensor.

8. The visitor counting system as in claim 1, wherein the faulty-sensor detection block includes a threshold value and when the number of the missing records exceeds the threshold value the sensor is deemed faulty.

9. The visitor counting system as in claim 8, wherein the faulty-sensor detection block is further adapted to compare the amounts of the missing records of the sensors connected to the same data-recording device, wherein when the missing records of each sensor exceeds the threshold value the data-recording device is deemed faulty.

10. The visitor counting system as in claim 9, wherein the faulty-sensor detection block is further adapted to compare the amounts of the missing records of the sensors connected to the same data-recording device with the missing records of the sensors connected to other data-recording devices, wherein when the missing records of each sensor exceeds the threshold value the power interruption it the site is identified.

11. The visitor counting system as in claim 1, wherein the interpolation block creates the new record automatically.

12. The visitor counting system as in claim 1, wherein the interpolation block creates new records only in response to an acceptance message received from a person responsible for the operation of the sensors in the establishment.

13. The visitor counting system as in claim 1, wherein a movable sensor validation unit is installable near a sensor to be validated, and wherein the sensor validation unit includes a high accuracy sensor for counting the number of visitors.

14. The visitor counting system as in claim 13, wherein the number of visitors counted by the movable sensor validation unit is compared with the number of visitors counted by the sensor to be validated, and the number of visitors in the records produced by the sensor to be validated are corrected based on said comparison.

* * * * *